UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BLACK AZO DYE.

SPECIFICATION forming part of Letters Patent No. 560,448, dated May 19, 1896.

Application filed January 20, 1896. Serial No. 576,119. (Specimens.) Patented in France December 21, 1894, No. 238,621, and in England December 22, 1894, No. 25,018.

*To all whom it may concern:*

Be it known that I, ARTHUR WEINBERG, a citizen of Prussia, and a resident of Frankfort-on-the-Main, Germany, have invented new and useful Improvements in the Production of Azo Coloring-Matters, of which the following is a specification.

This invention, for which patents have been obtained in France, certificate of addition dated December 21, 1894, brevet No. 238,621, and in Great Britain, No. 25,018, dated December 22, 1894, relates to the production of azo coloring-matters which are adapted for dyeing unmordanted cotton deep-black shades, especially fast against the influence of alkalies. The general constitution of the new substance is expressed by the following formula:

Amidonaphtholsulfo-acid I—amidonaphtholsulfo-acid II—metadiamin
|
Paradiamin—metadiamin.

In order to carry out my invention, different methods may be employed. For instance, the tretrazo derivative of a paradiamin (such as benzidin, tolidin, diamidodiphenolether, diamidodiphenylamin) is combined in an alkaline solution with one molecule of an amidonaphtholsulfo-acid, (such as gamma-amidonaphtholsulfo-acid, 2.8 amidonaphthol, 3.6 disulfo-acid.) The intermediate compound thus produced is diazotized again and combined with one molecule of the same or of another amidonaphtholsulfo-acid in alkaline solution. My researches have shown the astonishing fact that the free diazo group of the paradiamin does not combine in this case, but only the diazotized amido group of the amidonaphtholsulfo-acid. If now nitrous acid is allowed to react on the compound, a new tetrazo body of the constitution

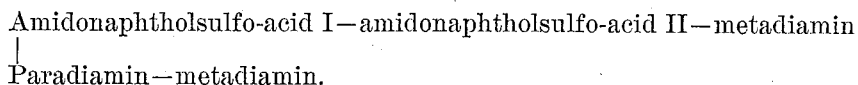

is formed, which, brought together with two molecules of metaphenylenediamin or of its substitutes, (such as metatoluylenediamin, chrysoidins,) yields the new black dyestuffs. Another method consists in combining acetparaphenylenediamin with an amidonaphtholsulfo-acid in alkaline solution, removing the acetyl group, tetrazotizing the diamidoazo body, combining with one molecule of an amidonaphtholsulfo-acid, diazotizing again, and finally combining with two molecules of a metadiamin. I have further found a third method, which in some cases is especially convenient for the production of the new class of coloring-matters. I combine the diazo derivative of an amidonaphtholsulfo-acid with one molecule of the same or of another amidonaphtholsulfo-acid in an alkaline solution. The thus-formed monoazo dyestuff is then allowed to react with an equivalent quantity of a tetrazo compound of a paradiamin. The intermediate compound is then treated in acidulated solution with nitrous acid and finally combined with two molecules of a metadiamin, as above described.

The following examples will serve to illustrate the manner in which my invention can be carried into practical effect:

Example I: 24.5 parts by weight of dianisidin are tetrazotized and then allowed to run into the alkaline solution of thirty-two parts by weight of 2.8 amidonaphthol 3.6 disulfoacid. An excess of muriatic acid is added, and then seven parts by weight of nitrite are introduced. The diazotation will be soon complete. The solution is rapidly mixed with an alkaline solution of twenty-four parts by weight of gamma-amidonaphtholsulfo-acid at a temperature of about 0° centigrade, and immediately thereafter it is again acidulated with muriatic acid. Seven parts by weight of nitrite are now to be added in order to effect the second diazotation, which will be finished within about two hours. The thus-formed tetrazo body is finally brought into the weakly alkaline solution of twenty-two parts by weight of metaphenylenediamin. The solution is then heated to about 40° centigrade, the coloring-matter is precipitated by means of common salt, filtered off, and dried.

Example II: Twenty-four parts by weight of gamma-amidonaphtholsulfo-acid are diazotized by means of seven parts by weight of nitrite and introduced into the alkaline solution of thirty-two parts by weight of 2.8 amidonaphthol 3.6 disulfo acid. To the dark-violet solution which is thus obtained the tetrazo compound produced from 21.2 parts by weight of tolidin is added. The intermediate body is formed at once. The solution is then acidulated with muriatic acid and the operation is finished, as described in the first example.

Having now described my invention and in what manner the same is to be carried out, I claim as new and desire to secure by Letters Patent—

1. The process of producing azo dyes by treating the intermediate compound of the general constitution paradiaminamidonaphtholsulfo-acid I amidonaphtholsulfo-acid II with nitrous acid and combining the thus-produced tetrazo compounds with two molecules of a metadiamin substantially as described.

2. The new black azo coloring-matter of the chemical constitution

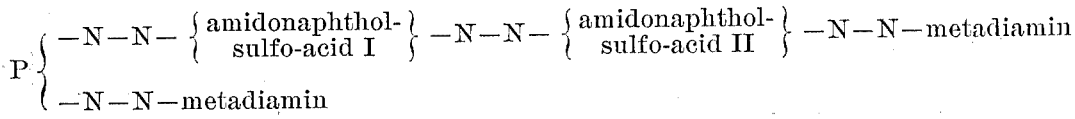

where P stands for the rest of a paradiamin which is a black powder, easily soluble in hot water with a bluish-black color, insoluble in alcohol, ether or benzene, soluble in concentrated sulfuric acid with bluish-black color, which solution separates a black precipitate on addition of water; adapted for dyeing unmordanted cotton a deep black fast to alkalies substantially as described.

In testimony that I claim the foregoing as my invention I have signed my name, in presence of two witnesses, this 6th day of January, 1896.

ARTHUR WEINBERG.

Witnesses:
ALVESTO S. HOGUE,
JEAN GRUND.

It is hereby certified that in Letters Patent No. 560,448, granted May 19, 1896, upon the application of Arthur Weinberg, of Frankfort-on-the-Main, Germany, for an improvement in "Black Azo Dyes," errors appear in the printed specification requiring correction as follows: In line 17, page 1, the word "substance" should read *substances*, and in line 21, same page, the word "tretrazo" should read *tetrazo;* and the said Letters Patent should be read with these corrections therein that the same may conform to the record of the case in the Patent Office.

Signed, countersigned, and sealed this 21st day of July, A. D. 1896.

[SEAL.]

JNO. M. REYNOLDS,
*Assistant Secretary of the Interior.*

Countersigned:
    S. T. FISHER,
        *Acting Commissioner of Patents.*